US006553316B2

(12) United States Patent
Bary et al.

(10) Patent No.: US 6,553,316 B2
(45) Date of Patent: Apr. 22, 2003

(54) METHOD AND SYSTEM FOR SYNCHRONIZING ELEMENTS OF A SEISMIC DEVICE USING A STANDARD TRANSMISSION NETWORK AND AN EXTERNAL TIME REFERENCE

(75) Inventors: Rénate Bary, rue Félix Faure (FR); Michel Guion, rue de la République (FR); Gérard Thierry, Villa Blanche (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/842,793

(22) Filed: Apr. 27, 2001

(65) Prior Publication Data

US 2001/0039478 A1 Nov. 8, 2001

(30) Foreign Application Priority Data

Apr. 28, 2000 (FR) .......................................... 00 05598

(51) Int. Cl.⁷ .............................................. G06F 19/00
(52) U.S. Cl. ........................... 702/16; 367/49; 181/112
(58) Field of Search ...................... 702/14, 16; 367/49, 367/79; 181/112; 377/20

(56) References Cited

U.S. PATENT DOCUMENTS 4,628,494 A    12/1986   Rialan et al. ................. 307/79
5,077,698 A  * 12/1991   Beauducel .................... 367/79
5,245,647 A  *  9/1993   Grouffal et al. .............. 377/20
6,041,283 A  *  3/2000   Sigmar et al. ................ 702/16
6,061,299 A  *  5/2000   Grouffal et al. .............. 367/49
6,260,656 B1 *  7/2001   Orban et al. ................. 181/112

FOREIGN PATENT DOCUMENTS

| FR | 2538194  | 6/1984 | ......... H04B/7/0005 |
| FR | 2770732  | 5/1999 | ............ H04Q/9/00 |
| GB | 2333841  | 8/1999 | ............ G01V/1/22 |

* cited by examiner

Primary Examiner—Edward Lefkowitz
Assistant Examiner—Victor J. Taylor
(74) Attorney, Agent, or Firm—Antonelli, Terry, Stout & Kraus, LLP (57) ABSTRACT

A method and system for transferring synchronization data between a central control and seismic recording station and dependent stations in all the cases where the time of transmission through the connection channels between the elements may be liable to too great fluctuations is disclosed. The invention provides a central station (CCU) and intermediate local control and concentration stations (RRS), each connected to local acquisition units (RTU), with a common time reference or clock (H) (that can for example be provided by a satellite positioning network of a well-known type such as the GPS system, or based on the carrier frequency of a radio transmitter) which is picked up by specialized receivers associated with the elements of the seismic device, and in using this common reference to calculate the real transmission time and to local readjust seismic acquisition units (RTU).

41 Claims, 6 Drawing Sheets

METHOD AND SYSTEM FOR SYNCHRONIZING ELEMENTS OF A SEISMIC DEVICE USING A STANDARD TRANSMISSION NETWORK AND AN EXTERNAL TIME REFERENCE

BACKGROUND OF THE INVENTION

Field of the Invention

The present invention relates to a transmission method and system using a standard transmission network for connecting elements of a seismic device, allowing to transmit with precision a signal indicative of a time break.

Description of the Prior Art

In the field of seismic prospecting signals received by seismic receivers distributed on the ground surface, which are reflected by discontinuities of the subsoil in response to the emission of seismic waves by a vibrational or impulsive source, are recorded. Seismic data collection sets comprising a large number of acquisition units distributed on the site to be explored and suited to collect (amplify, filter, digitize and store) the signals are used. The stored data are transmitted to a central control and recording station from each acquisition unit at fixed time intervals (for example after each emission-reception cycle, after each daily session, etc.) or, as soon as a transmission time interval is available. The transmission of stored data is either direct, or via intermediate stations or concentrators.

Seismic acquisition systems are for example described in U.S. Pat. Nos. 4,583,206, 4,628,494, 5,245,647, 5,550,787, 5,706,250, 5,563,847 and 5,822,273.

It is important that all the acquisition units distributed on the explored site can be synchronized with a common time break, generally the time of triggering of the seismic source, whatever the distance from the central station that transmits the indicative signal thereto and whatever the transmission channel used. Therefore, collection of centralized data can be very imprecise.

There are well-known methods and devices allowing perfect readjustment in time of distant stations to a central station communicating by means of communication channels, provided that it has been possible to measure the time of propagation of the signals on these channels.

U.S. Pat. No. 4,628,494, filed by the assignee describes, a method for synchronizing the acquisition of seismic signals by an acquisition unit in the field with a time break such as the time (TB) of triggering of a seismic source in the case where the time of propagation Δt thereto of the signal indicative of this time, via a transmission channel such as a cable or a radio channel, is known. The method essentially sends a pre-signal initiating the acquisition of the signals coming from the seismic receivers and their storage in a local memory. When the synchronization signal subsequently emitted is received by the acquisition unit at a time t, all the samples stored from the time (t−Δt), i.e. the time break, are sought in the local memory.

French Patent Application 98/15,792 describes a method and a device also allowing to produce, for each seismic signal, a series of samples of these signals, re-staggered from a time break, from a first series of digitized samples of the seismic signal produced from any time break prior to the time break, based upon knowledge of the effective time interval between these two times. The method comprises determining coefficients of a digital filter likely to compensate for the fractional part of the effective time interval measured, and applying this digital compensation filter to the first series of samples, thus allowing obtaining of a series of digitized samples re-staggered from the time break.

However, these known locating and readjustment techniques are applicable only if the time of propagation of synchronization signals through the emitting and receiving stations is known with precision. Transfers are, managed by software using multitask management with uncertainty about the effective propagation time in a seismic transmission system as mentioned above not exceeding about 50 μs.

Transmission without a random time lag is possible and easier to implement when one owns the network that is used is owned by the party performing the test and in control of the emitted signals a coding mode is maintained. When the TB signal indicating the effective time of emission by the source reaches the central station, it is possible, via suitable circuits, to inject this signal directly into the communication channel that connects it to the receiving station, and thus to prevent possible non-constant delays due to the station management information system.

Standard communication networks are advantageous. They allow high-rate transmissions, they are relatively simple to use and open-ended. They however work according to a particular communication protocol with specialized pilot and control circuits which have to be adapted to in order to transmit signals representative of time breaks with precision.

This is the case in the system described in French Patent Application 99/12,113 filed by assignee which uses a standard communication network of Ethernet type to connect a central control and seismic recording station to dependent stations: local intermediate control and concentration stations, local acquisition units, and to transmit a synchronization signal (TB) thereto. The time of transit of the data on the transmission channels between the central station and the acquisition units is measured beforehand, acquisition of the seismic data by the acquisition units is pre-initiated; and the retention time interval in relation to the time of reception of the synchronization signal is fixed and greater than the transit time. An adjusted compensation delay is applied to the synchronization signal in the intermediate station in order to account for the fluctuations of the effective transfer time linked with its passage through a multitask control of the intermediate stations and the transmission network so as to respect the retention time interval. All the acquisition units can thus be perfectly synchronized.

This method is quite suitable when the time of transit via the transmission channel is constant and can be measured beforehand, which is the case with a standard communication network comprising material links (low-rate wired Ethernet network for example).

On the other hand, in any other case where the time of transit on the available channel of the standard network (radio link for example) is likely to fluctuate within a time interval incompatible with the precision required for transmission of a synchronization signal such as a TB, the compensation schemes of the prior system are inadequate.

SUMMARY OF THE INVENTION

The transmission method according to the invention uses a standard communication network for transferring synchronization data between a central control and seismic recording station and dependent stations (local seismic data acquisition, processing and transmission units depending on the central station either directly or via one or more intermediate local control and concentration stations, itself connected to local acquisition units), in the case when the transmission time on the connection channels between the elements is subject to great fluctuations.

The transmission system according to the invention has applications in many fields where distant stations have to be synchronized without necessarily using dedicated communication means.

In principle, the invention provides the communicating stations with a common time reference that can be delivered for example by signals picked up by receivers and transmitted by a satellite positioning network of a well-known type such as the GPS system or the carrier frequency of a radio transmitter, and in using this common reference to calculate the real transmission time and to locally readjust the seismic acquisition time break.

The transmission method according to the invention transfers, via a standard communication network (LAN), a synchronization signal indicating a time break (TB) between a central control and seismic recording station (CCU) and seismic signal acquisition and storage units (RTU) distributed in the field, when the time of transit of the synchronization signal through at least part of the connection channels of the standard network between the central station and at least one dependent station (which can be an intermediate station (RRS), itself connected by cables or fibres to acquisition units in the field (RTU) or possibly each acquisition unit in configurations where they directly controlled by the central station) may be liable to fluctuations within a determined fluctuation margin.

The method comprises:
  a learning stage including formation of a specific frame and storage thereof by each station, and detection in each dependent station of signals delivered by a clock exterior to the device,
  pre-initiation of the acquisition of seismic data by acquisition units (RTU) with a retention time interval in relation to the time of reception of synchronization signal (TB) which is fixed and greater than the maximum transit time, considering the fluctuation margin,
  first precise dating of time break (TB) from the external clock and transmission of the data obtained with this first dating in form of the specific frame to the dependent stations,
  detection of the time of arrival, in each dependent station, of the specific frame and second dating of this time of arrival from the external clock, and
  measurement of the effective transit time equal to the time interval between the data associated with the first dating and those associated with the second dating, and consequently readjustment of the time break to the seismic data stored in acquisition units (RTU).

The pre-initiation time is for example the time of transmission to a seismic source (S) of a fire order.

In the case where the (or each) dependent station is a local station (RRS) connected to at least one acquisition unit (RTU) by a material link with a fixed transit time, and to central station (CCU) by a fluctuating transit time link, a readjustment to the seismic data stored in acquisition units (RTU) is applied by taking into account the fixed transit time.

The method comprises for example:
  direct detection, in central station (CCU), of synchronization signal (TB),
  formation, from the synchronization signal detected, of the specific frame and direct application thereof to an interface module (TCI) of central station (CCU),
  detection, in an interface module (TCI) of each dependent station, of a specific frame of synchronization signal (TB), and
  application, to synchronization signal (TB) of the dependent station, of a time lag equal to the measured transit time.

The method is particularly flexible by allowing, by means of an adjustable transmission delay time compensation, easily taking into account the various data transfer rates of the transmission channels available in a complex transmission system as used for example in modem seismic prospecting devices.

The transmission system according to the invention transfers, by means of a standard communication network (LAN), a synchronization signal indicating a time break (TB) between a central control and seismic recording station (CCU) and seismic data acquisition and storage units (RTU) distributed in the field, when the time of transit of the synchronization signal through at least part of the connection channels of the standard network between the central station and at least one dependent station may be liable to fluctuations within a determined fluctuation margin. The system comprises:
  means for forming a specific frame, storage means allowing each element of the seismic device to store this specific frame, and a local clock (RXGPS) controlled by synchronization signals provided by the external clock (H) in order to generate a dating time scale, the local clock being associated with the elements of the seismic device,
  means for pre-initiating, in acquisition units (RTU), acquisition of the seismic data with a retention time interval in relation to the time of reception of synchronization signal (TB) that is fixed and greater than the maximum transit time, considering the fluctuation margin,
  counting means associated with each local clock so as to perform a first precise dating of time break (TB) in accordance with the external clock and transmission means for transmitting the data obtained with this first dating in form of the specific frame to the dependent stations,
  means for detecting the time of arrival, at each dependent station, of the specific frame and counting means associated with the local clock for performing a second dating of the time of arrival in accordance with external clock (H), and
  counting means for determining the effective transit time equal to the time interval between the data associated with the first dating and those associated with the second dating, and means for accordingly readjusting the time break to the seismic data stored in acquisition units (RTU).

The system comprises for example an interface set (TBG/I) in a central station (CCU) for directly generating on a transmission channel, to each dependent station, a frame carrying the data from the first dating, an interface set (TBD/I) for decoding the specific frame, counting means (D-CPT) for performing the second dating in accordance with external clock (H) and for determining the effective transit time of the synchronization signals.

In the case where the (or each) terminal station is a local station (RRS), a generator (SYNCTB-G) for generating a signal (SYNCTB) synchronous with the delayed signal to acquisition units (RTU).

The common external clock is for example synchronization signals emitted by a satellite positioning system and, each element of the seismic device comprises a suitable detection module.

The common external clock can also be for example of synchronization signals emitted by a radio transmitter and, each element of the seismic device comprises a suitable detection module.

The combination of a fixed retention time applied by all the acquisition units and of intermediate delay adjustment means suited to complete the propagation times measured on the transmission channels by reference to an external clock allows all the acquisition units to be adjusted together to the same time break.

Whether the time of transmission by the network is known with precision or not, it is possible to combine such a network with conventional dedicated transmission channels using optical fibres, radio or cable links, while maintaining a perfect synchronism between these various channels.

BRIEF DESCRIPTION OF THE DRAWINGS

Other features and advantages of the method and of the system according to the invention will be clear from reading the description hereafter of a non limitative example, with reference to the accompanying drawings wherein.

DETAILED DESCRIPTION OF THE PREFERRED EMBODIMENTS

The method and the system according to the invention will be described within the particular scope of an application to a seismic prospecting device already described in U.S. Pat. Nos. 5,550,787, 5,706,250 and 5,822,273 mentioned above.

I) Seismic Device

The seismic device comprises (FIG. 1) an often large number of (several hundreds to several thousands) of seismic receivers R each producing a seismic trace in response to the transmission in the ground of seismic waves produced by a source S coupled with the ground and reflected by discontinuities of the subsoil. Receivers R are subdivided into n groups GR1, GR2, . . . , GRn, comprising each a certain number q of receivers R Local acquisition and transmission units RTU referenced as $BA1_1, \ldots, BAp_k, \ldots, BAp_n$, similar for example to those described in U.S. Pat. No. 5,822,273 mentioned above, are placed in the field. Each RTU digitizes, and temporarily stores the seismic data collected by one or more receivers R of each group. Any group GRk of order k for example comprises a certain number q of receivers respectively connected to p local acquisition units RTU referenced $BA1_1, BAp_k$, for example. Numbers p and q can be different if at least part of the local units RTU ($Bap_2$ for example in FIG. 1) is intended to collect the seismic data coming from more than one seismic receiver R. The seismic device can thus comprise for example several hundred RTUs.

The various groups of acquisition units RTU are respectively controlled by local control and concentration stations RRS referenced RRS1, RRS2, . . . , RRSi, . . . , RRSk, . . . , RRSn. These local stations perform extensive functions:

- control the acquisition units RTU of their respective groups,
- collect the seismic data (seismic traces) of the various units RTU, store them in a mass memory (one or more disks for example),
- transfer on request to central station CCU at least part of the data stored: either parameters indicative of the proper operation of the acquisition units or of the local stations (RRS), or at least partially compressed, of each seismic trace, in order to carry out a quality control,
- manage testing and initialization operations on the connection means (radio channels or lines) and on the field equipment (seismic receivers, electronic devices in each acquisition unit RTU), check the progress of seismic operations, and inform on request results and possible anomalies.

The various concentrators RRS, like source S, are controlled by a central control and recording station CCU where all the seismic data are finally grouped together. Local stations RRS communicate with central station CCU via a local network LAN of a well-known type (Ethernet™ for example) comprising material links (cable or optical fibre L) or radio links $RF_1, RF_2, \ldots RF_n$. The network works according to a specific transmission protocol.

II) Local Control and Concentration Stations (RRS)

Figure 2:
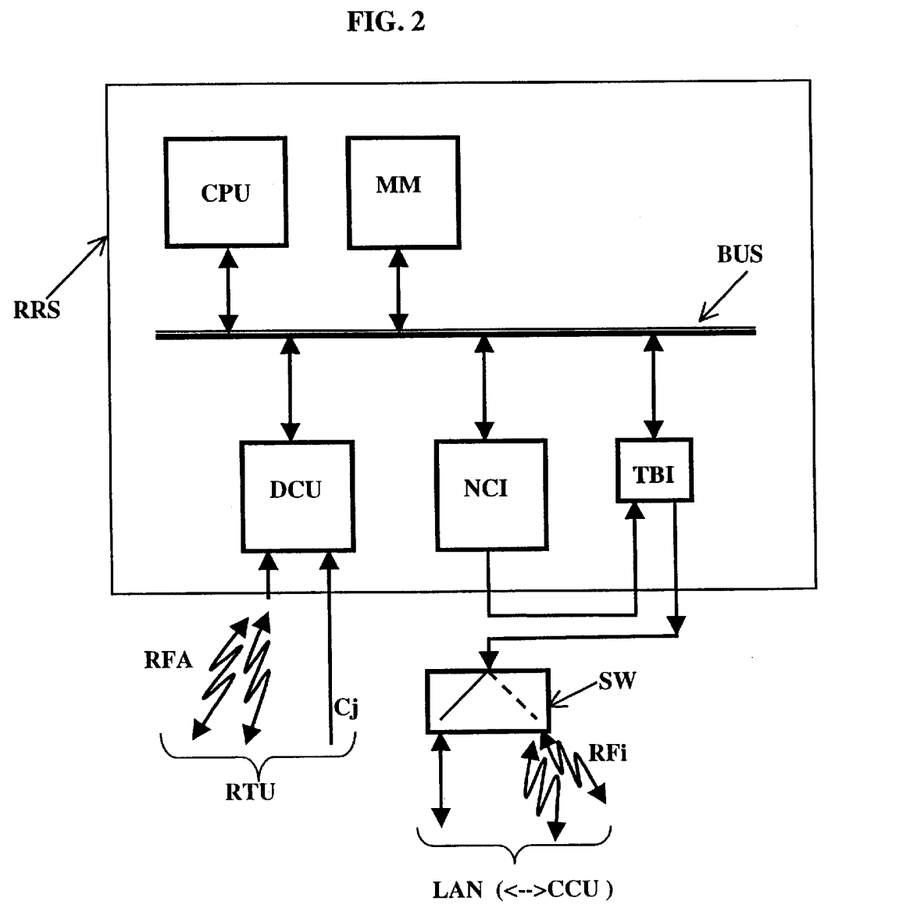
Figure 4:
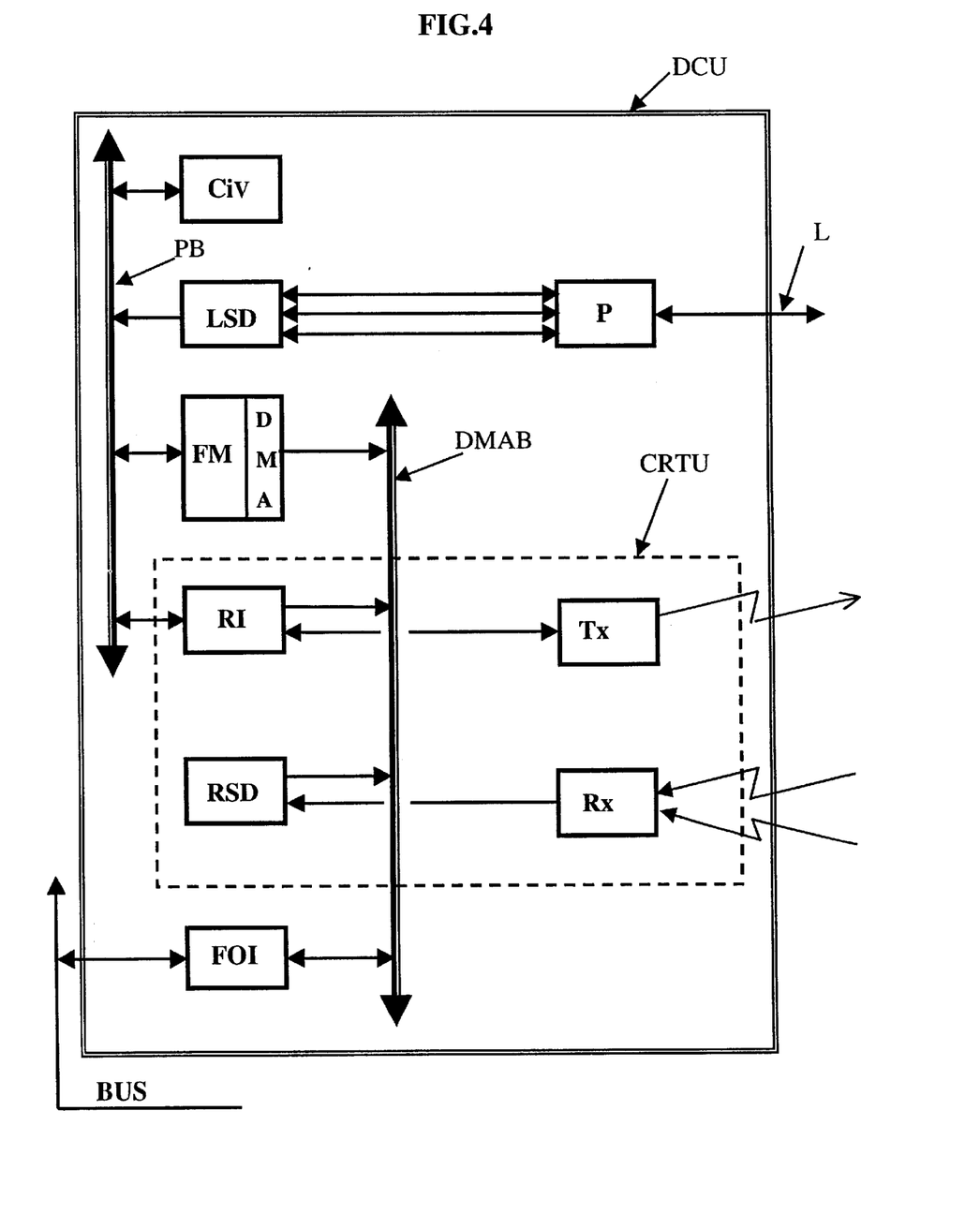

Each local station RRS comprises (FIG. 2) a central unit CPU with an extended RAM memory (32 $M_o$ for example), communicating by means of an internal bus BUS with a mass memory MM of several $G_o$, and a concentration unit DCU (see FIG. 4) for managing the communications of each local station RRS with local acquisition units RTU, either by means of radio channels $F_{kj}$ and/or by transmission cables or lines Ci.

Figure 5:
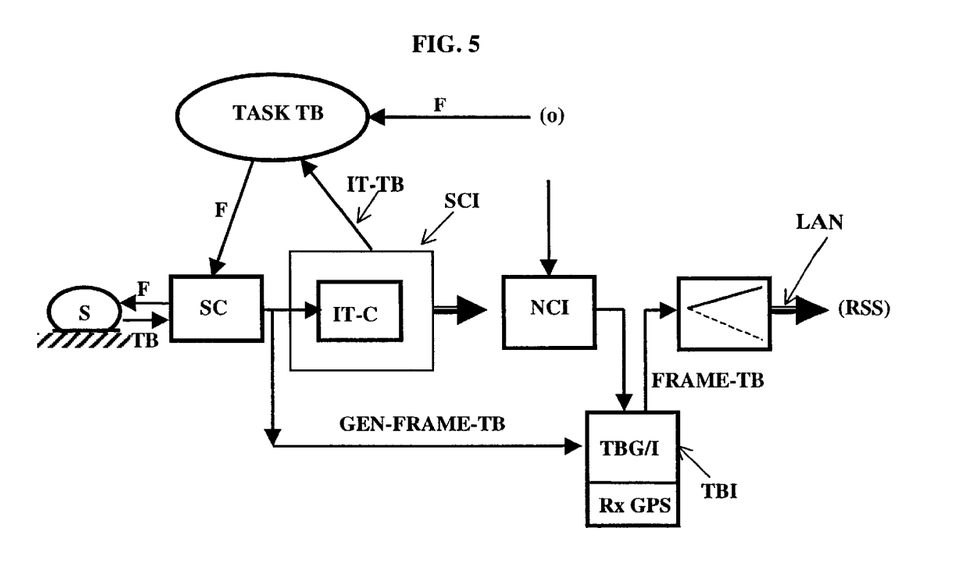
FIG. 5 is a block diagram showing the progress, in central station CCU, of the operations of emission of synchronization signal TB.

An interface set NCI is also connected to internal bus BUS. Network LAN comprising one or more lines L and/or radio transmission channels RFB, used for communication with central unit CCU, is connected to interface set NCI by means of a channel switch SW. An interface TBI, detects on network LAN, signals indicative of the time break when seismic source S is triggered, is connected to interface set NCI on the one hand and to internal bus BUS on the other. The functionalities of elements NCI and TBI are described below in connection with FIGS. 5 and 6.

III) Central Control Station CCU

Figure 3:
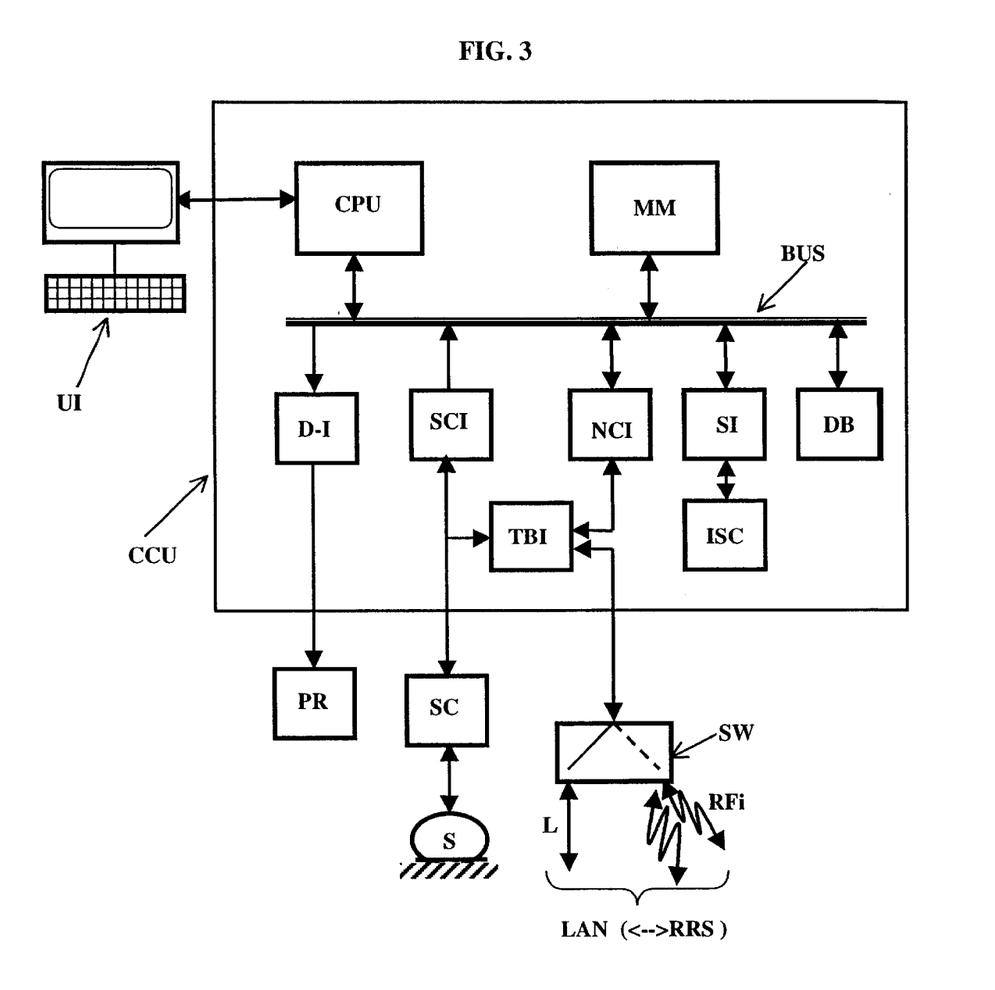

Central station CCU also comprises a central-unit CPU provided with an extended RAM memory communicating by means of an internal bus BUS with a mass memory MM of high capacity, sufficient for storage of the seismic traces transmitted by the acquisition units via control and concentration units RRS. The central station also comprises a local dialogue terminal UI for the operator and a printer PR allowing high-definition printing of seismic sections, maps, etc., which is connected to internal bus BUS by an interface card D-I. A high-capacity mass memory DB for storing a database consisting of seismic data, geographic data, etc., is also connected to internal bus BUS. An image scanner ISC used to enter into the database of memory DB possibly a geographic map of the zone where seismic operations are carried out, which is also connected to the internal bus BUS bus by means of an interface element SI. Such an image of the zone of operations can be used to match the points of installation of the field pickups with precise geographic coordinates.

Seismic source S is controlled by a control box SC forming, when triggered, an indicative signal TB that is applied to central unit CCU by means of an interface card SCI.

An interface set NCI specifically suited to control a local area network LAN is also connected to internal bus BUS. Local area network LAN (lines L and/or radio transmission channels Rfi) used for connection with each local station RRS is connected to interface set NCI by means of a channel switch SW. An interface circuit TBI is interposed in parallel between interface elements NCI and SCI. The functionalities of elements NCI and TBI are described below in connection with FIGS. 5, 6 and 7.

Concentration module DCU of each local station RRS (FIG. 4) is intended to relay the transmission of the commands of control unit CPU to local stations RRS and, conversely, the reception of the seismic data. It comprises two electronic cards. A first card carries a set CiV whose functions will be described in connection with FIG. 5 and a synchronous line detection circuit LSD that communicates through input/output ports P with one or more transmission lines Ci for communication with acquisition units RTU in the field (FIG. 1). A second card carries memory modules FM with direct memory access DMA, accessible by means of an internal bus DMAB. Interface circuit FOI allows exchanges between exchange bus DMAB and central unit CPU (FIG. 2), by means of internal bus BUS. The first three cards CPU, LSD, FM communicate by means of an internal bus PB.

Each concentration unit DCU comprises a radio transmission unit CRTU similar to the unit described in U.S. Pat. No. 5,563,847 mentioned above, which is suited, when this mode of connection is established, to establish communications by a radio channel with local units RTU. This unit CRTU comprises (FIG. 4) an interface circuit RI connected to exchange bus DMAB, to internal bus BUS and to a radio transmitter Tx emitting for example in the well known TFM (Tamed Frequency Modulation) mode and a synchronous radio modulation detection circuit RSD connected to a radio receiver Rx.

IV) Programming Activities by Tasks

As also described in the aforementioned U.S. Pat. No. 5,563,847, the various activities providing the processes are divided into catalogued tasks, each dedicated to a specific process and each in the form of program integrated in the computers in central station CCU 1, in local stations RRS and local units RTU.

The tasks can be carried out sequentially or concurrently via switches. A real-time distribution program manages the start or the interruption of tasks by taking into account their respective priority degrees or their resumption when they have been interrupted a) when all the required data were not available at a time of their execution, or b) upon reception of an interrupt message from another task, or c) as a result of an exterior event.

Definition of a task requires taking into account its function, all the data required for its execution, the required control programs (drivers), all the interruptions imposed by the task and the pre-established priority degree thereof The tasks can have access to a database, consisting of parameters entered by the operator, of the acquired seismic data and of the seismic system,control parameters.

Figure 8:
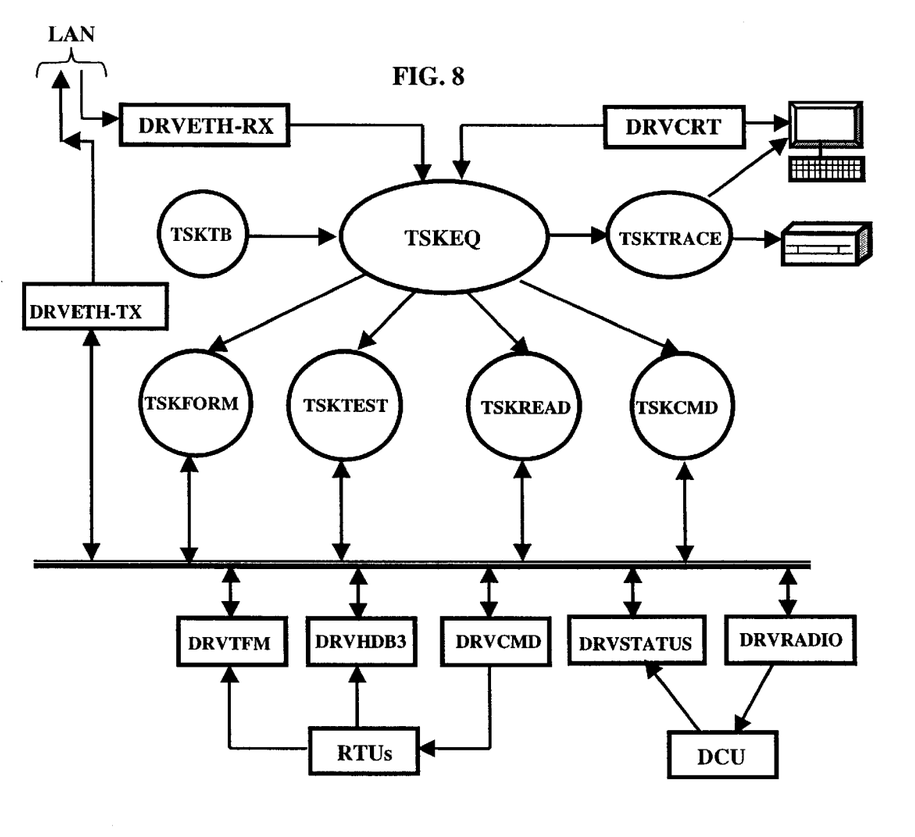
FIG. 8 is a general block diagram of the software management of the functions fulfilled by a local station.

Interdependence relations of the various tasks fulfilled by each local control and concentration station RRS for example are shown in the diagram of FIG. 8.

V) Transmission of Synchronization Signal TB by Local Network LAN

Repetitive transmission, without delay, to the dependent stations (local intermediate stations RRS or directly to acquisition units RTU in the case where they are directly connected to central station CCU), of signal TB indicative of the precise time of triggering of source S (time of firing) is performed using the following procedures:

No traffic takes place on all of the local area network LAN when firing is initiated.

If the effective time of transit of the signals on each transmission channel of local area network LAN between central station CCU and the dependent stations is constant and reproducible as the result of using cable link, optical fibre link, etc., the effective time of transit is measured with precision once and for all when connecting each dependent station local area to network LAN, as described in the aforementioned French Patent Application 99/12,113.

If the effective transit time of these signals is fluctuating but below a known limit value when wireless connections are used, clock signals are provided by an external time reference accessible to all the elements of the seismic device (dating system), which are accessible where the seismic operations are carried out, as described hereafter.

These signals can be, for example, clock signals emitted at regular intervals (every second for example) by a positioning system such as the GPS (Global Positioning System) system or synchronization signals emitted by a radio station and adjusted to an atomic clock. The synchronization signals are received by specialized receivers associated with the elements of the seismic device.

Figure 1:
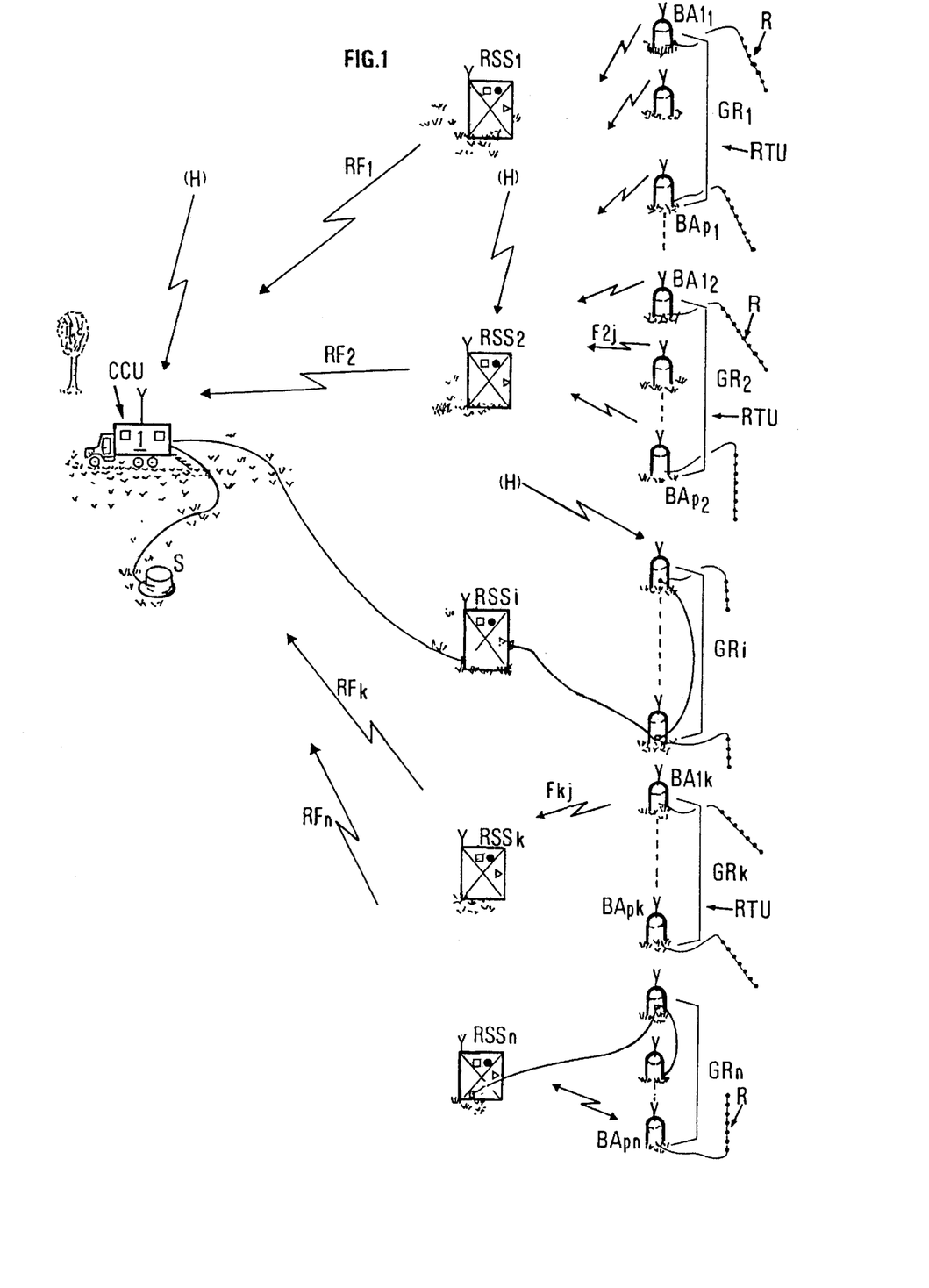
FIG. 1 diagrammatically shows a seismic device positioned in the field with various transmission channel possibilities between the elements, FIG. 2 diagrammatically shows a local concentration station RRS, FIG. 3 diagrammatically shows general central station CCU, FIG. 4 diagrammatically shows a concentration module DCU inside a local station RRS.

Emission of signal TB from the local stations RRS on the cables connecting them to acquisition units RTU in the configuration shown in FIG. 1 is retarded by a known fixed delay. This delay, which takes into account all the transit times in the transmission system and the allowable fluctuation margins, is known by acquisition units RTU.

When signal TB is received by acquisition boxes RTU, acquisition of the seismic signal has already started before with a starting presignal (pre-TB). As already described in U.S. Pat. No. 5,245,647, the acquired seismic samples are stored in a buffer memory of acquisition units RTU whose size is sufficient to contain all the samples acquired during a time interval between the presignal and the first sample to be held, which are acquired after the reference time break.

This time interval is conventionally selected greater than the maximum time of propagation of the signals on the physical transmission channels used while remaining compatible with the size of the buffer memories. Since the real transmission time of the synchronization signal is likely to fluctuate when multitasking microcomputers or various transmission means such as optical fibres, radio channels or cables, are used, the method comprises, if necessary, applying intermediate adjustable delays (by using retarding counters) which complete the intangible delays (propagation times measured once and for all when the seismic device is installed in the field) or the delays measured by reference to a common time scale, so that all the acquisition units RTU are synchronous with the time break after this time interval.

V-1) In Central Station CCU

Dating or timing of events is based on the recognition of a particular frame emitted, which requires a prior learning stage. Reference frame FRAME-TB is emitted by the central station and stored in set TBG/I of interface TBI. It is this frame that will afterwards be emitted upon reception of synchronization signal TB indicating the start of the seismic acquisition.

The prior learning stage of the reference frame, whatever the form thereof in the specific transmission protocol, automatically accommodates any possible change in the standard local area network LAN used.

The progress of the firing sequence operations in the station is as follows:

Operator O initiates the seismic shooting (FIG. 5) and the corresponding signal F is sent to a task TB of central station CCU.

A pre-initiation signal is transmitted through the local area network LAN to local stations RRS which transmit the preinitiation to acquisition units RTU. Upon reception of this signal, the acquisition units start acquiring the signals coming from the receivers in the field and store them in a buffer memory.

Task TB emits a signal F that is relayed to source S through its control box SC, thus causing its initiation.

This initiation time is signalled to central station CCU by a signal TB.

Signal TB is sent to an interruption controller IT-C in interface module SCI, which leads to the interruption of the task in progress and an interruption signal IT-TB is taken into account nearly immediately. Task TB takes signal IT-TB into account in order to control the proper progress of the operations. Control box SC simultaneously produces a signal GEN-FRAME-TB. Interface circuit TBI comprises a set TBG/I connected to the local area network LAN between network control interface NCI and switch SW and suited to generate a frame TB-FRAME therein (see FIG. 7).

The receiver of the GPS positioning system produces signals at intervals of the order of one second. A dating or timing counter supplied by a 1-MHz internal clock for example, which provides an intermediate time scale (1 $\mu$s period) is associated with the receiver of the GPS, which allows dating any event occurring in each interval. The emission of each GPS signal initializes the dating counter. The value displayed by counter TBDATE is stored upon reception of signal GEN-FRAME-TB.

Upon reception of signal GEN-FRAME-TB, value TBDATE of the dating counter is inserted into reference frame FRAME-TB and transmitted without delay to the dependent stations which are the acquisition units or intermediate stations.

V-2) In local stations RRS

Interface TBD/I (of the type described in FIG. 7) is connected to network LAN between switch SW and network control interface NCI to detect the specific frame of the TB. The DCU in each local station RRS comprises, in set CiV (FIG. 4), a delay time counter D-CPT and a generator SYNCTB-G producing a frame signal synchronous with signal TB.

Task RXTB (FIG. 6) initializes counter D-CPT with the predetermined fixed delay greater than the propagation time through all the connection channels used.

The learning stage is similar to that described for the central station.

From the reception of frame Pre-TB, frame detection interface TB monitors the traffic on the physical link in order to detect frame TB.

Figure 6:
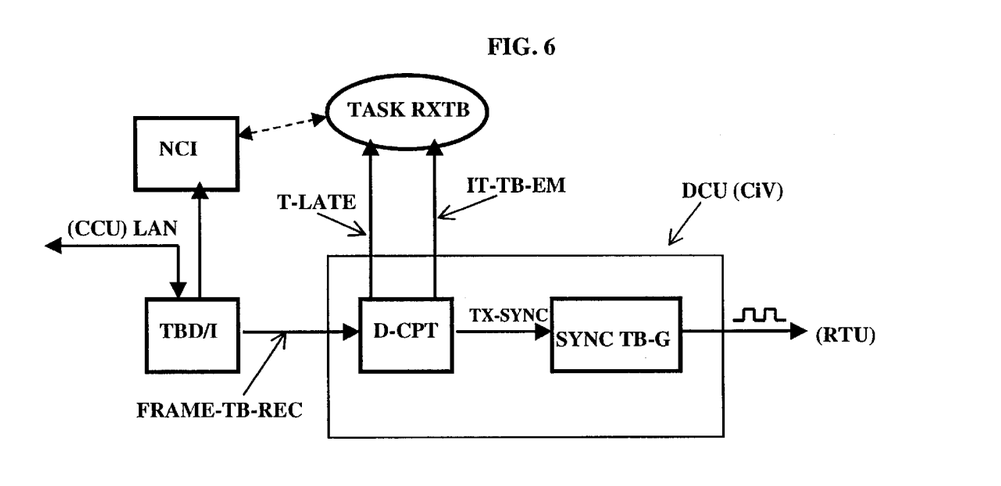
FIG. 6 is a block diagram showing the progress, in a local station RRS, of the operations of reception and delay adjustment of synchronization signal TB, FIG. 7 diagrammatically shows an interface circuit TBI adjustable, as the case may be, to the detection or the generation of a frame characterizing the synchronization signal.
Figure 7:
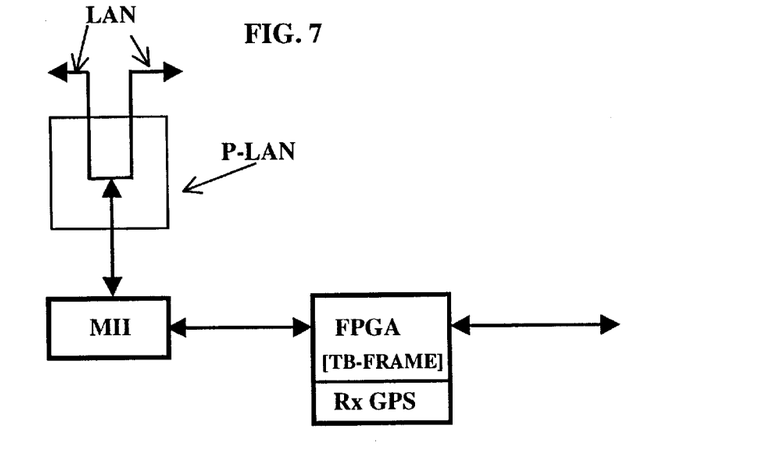

As soon as frame TB is detected, interface TBD/I takes the value from dating counter TBDATE1 in station RRS, extracts value TBDATE from the frame and subtracts it from TBDATE1. The value obtained is applied to counter D-CPT in order to adjust the emission delay of signal SYNCTB emitted towards acquisition units RTU. Signal FRAME-TB-REC then starts counter D-CPT.

The end of counting of counter D-CPT causes the emission of a signal TX-SYNC to a circuit SYNCTB-G in the DCU, which generates a signal SYNCTB that is then effectively transmitted to the acquisition boxes. When counter D-CPT is stopped, a signal IT-TB-EM is emitted towards task RXTB to indicate the end of processing of TB.

The DCU also comprises a counter (not shown) defining a time slot (signal T-LATE) after which, if no TB signal is detected, the waiting procedure in progress is cancelled.

The organization of the tasks in each local station RRS is shown in FIG. 8. The various abbreviations used to designate the elements and the tasks respectively mean:

DRVETH: local network driver;

DRVCRT: console driver;

TSKTB: TB task;

TSKEQ: sequencing task;

TSKTRACE: seismic trace storage task in a mass memory;

TSKFORM: field equipment installation control task;

TSKTTEST: test task;

TSKREAD: data reading task;

TSKCMD: command emission task;

DRVTFM: radio reception driver;

DRVHDB3: reception on lines driver;

DRVCMD: command emission driver;

DRSSTATUS: status driver, and

DRVRADIO: radio link driver.

Embodiments where the standard local area network LAN is used for connecting the central station to the intermediate stations have been described. The same technique may be used without departing from the scope of the invention in cases where the dependent stations on network LAN are acquisition units RTU.

It is also clear that the technique of measuring the delay with which synchronization signal TB is taken into account and the adjustable transmission delay compensation can be applied if a network referred to as owner network is used instead of a standard local area network LAN.

What is claimed is:

1. A transmission method for transferring, by means of a communication network, a synchronization signal indicating a time break between a central control and seismic recording station and seismic signal acquisition and storage units distributed in a field, when a time of transit of the synchronization signal through at least part of the connection channels of the communication network between the central station and at least one dependent station may fluctuate within a determined fluctuation margin, comprising:

a learning stage including formation of a specific frame and storage thereof by each station, and detection in each dependent station of signals delivered by a clock external to the device;

pre-initiation of acquisition of seismic data by the seismic signal acquisition and storage units with a retention time interval in relation to a time of reception of the synchronization signal which is fixed and greater than a maximum transit time, considering a fluctuation margin;

first dating of the time break from the external clock and transmission of the data obtained by the first dating in a form of a frame to the dependent;

detection of the time of arrival, in each dependent station, of the frame, and a second dating of a time of arrival from the external clock; and measurement of an effective transit time equal to a time interval between the data associated with the first dating and data associated with the second dating, and consequently adjusting the time break to the seismic data stored in the seismic signal acquisition and storage units.

2. A method as claimed in claim 1, wherein the retention time interval is a time of transmission to a seismic source of a fire order.

3. A method as claimed in claim 1, wherein each dependent station is a local station connected to at least one seismic signal acquisition and storage unit by a link with a fixed transit time, and to central station by a link with a variable transit time and the adjusting of the time breach is performed with the data stored in the seismic signal acquisition and storage units taking the fixed transit time into account.

4. A method as claimed in claim 1, wherein each dependent station is a seismic signal acquisition and storage unit (RTU).

5. A method as claimed in claim 1, comprising:
directly detecting the synchronization signal in the central station;
forming, from the detected synchronization signal the frame and directly applying the frame to an interfae module of the central station;
detecting the frame in an interface module of each dependent station; and
applying the synchronization signal in each dependent station with a time lag equal to the measured effective transit time.

6. A method as claimed in claim 2, wherein each dependent station is a local station connected to at least one seismic signal acquisition and storage unit by a link with a fixed transit time, and to central station by a link with a variable transit time and the adjusting of the time breach is performed with the data stored in the seismic signal acquisition and storage units taking the fixed transit time into account.

7. A method as claimed in claim 2, wherein each dependent station is a seismic signal acquisition and storage unit.

8. A method as claimed in claim 3, wherein each dependent station is a seismic signal acquisition and storage unit.

9. A method as claimed in claim 2, comprises:
direct detection the synchronization signal in the central station;
forming, from the detected synchronization signal the frame and directly applying the frame to an interface module of the central station;
detecting the frame in an interface module of each dependent station; and
applying the synchronization signal in each dependent station with a time lag equal to the measured effective transit time. frame and direct application thereof to an interface module of central station 10. A method as claimed in claim 6, comprising:
directly detecting the synchronization signal in the central station;
forming, from the detected synchronization signal the frame and directly applying the frame to an interface module of central station;
detecting the frame in an interface module of each dependent station; and
applying the synchronization signal in each dependent station with a time lag equal to the measured effective transit time.

11. A method as claimed in claim 6, wherein each dependent station is a seismic signal acquisition and storage unit.

12. A method as claimed in claim 6, comprising:
directly detecting the synchronization signal in the central station;
forming, from the detected synchronization signal the frame and directly applying the frame to an interface module of central station;
detecting the frame in an interface module of each dependent station; and
applying the synchronization signal in each dependent station with a time lag equal to the measured effective transit time.

13. A method as claimed in claim 7, comprising:
directly detecting the synchronization signal in the central station;
forming, from the detected synchronization signal the frame and directly applying the frame to an interface module of the central station;
detecting the frame in an interface module of each dependent station; and
applying the synchronization signal in each dependent station with a time lag equal to the measured effective transit time.

14. A method as claimed in claim 8, comprising:
directly detecting the synchronization signal in the central station;
forming, from the detected synchronization signal the frame and directly applying the frame to an interface module of the central station;
detecting the frame in an interface module of each dependent station; and
applying the synchronization signal in each dependent station with a time lag equal to the measured effective transit time.

15. A method as claimed in claim 11, comprising:
directly detecting the synchronization signal in the central station;
forming, from the detected synchronization signal the frame and directly applying the frame to an interface module of central station;
detecting the frame in an interface module of each dependent station; and
applying the synchronization signal in each dependent station with a time lag equal to the measured effective transit time.

16. A method as claimed in claim 4, comprising:
directly detecting the synchronization signal in the central station;
forming, from the detected synchronization signal the frame and directly applying the frame to an interface module of central station;

detecting the frame in an interface module of each dependent station; and applying the synchronization signal in each dependent station with a time lag equal to the measured effective transit time.

17. A transmission system for a seismic device which transfers, by means of a communication network, a synchronization signal indicating a time break between a central and seismic recording station and seismic signal acquisition and storage units distributed in a field, when a time of transit of the synchronization signal through at least part of connection channels of the network between the central station and at least one dependent station may fluctuate within a determined margin, comprising:

means for forming a frame, means for storage by an element of the seismic device of the frame, and a local clock associated with the element driven by synchronization signals provided by an external clock, which generates a dating time scale;

means which preinitiates, in the seismic signal acquisition and storage units, the acquisition of seismic data with a retention time interval in relation to a time of reception of the synchronization signal which is fixed and greater than the maximum transit time, considering a fluctuation margin, a counting means, assoiated with each local clock, which performs a first dating of the time break in accordance with the external clock and means for transmitting the data obtained with the first dating as a frame transmitted to each dependent station;

means for detecting a time of arrival at each dependent station of the fram and the counting means associated with the local clock performing a second dating of the time of arrival in accordance with the external lock; and a counting means for determining an effective transit time equal to a time interval between the data associated with the first dating and the data associated with the second dating, and means for adjusting the time break to the seismic data stored in the seismic signal acquisition and storage units.

18. A system as claimed in claim 17, comprising:

an interface set in the central station which directly generates on a transmission channel, to each dependent station, a frame carrying the data from the first dating;

an interface set for decoding the frame; and a counting means for the second dating in accordance with the external clock and for determining an effective transit time of the synchronization signal.

19. A system as claimed in claim 18, wherein the seismic device comprises a detection module for detecting synchronization signals emitted by a satellite positioning system.

20. A system as claimed in claim 17, wherein the terminal station is a local station comprising a generator for generating a signal synchronous with the time break of the seismic data stored in the seismic signal to acquisition units.

21. A system as claimed in claim 17, wherein the terminal station is a local unit.

22. A system as claimed in claim 17, wherein the the seismic device comprises a detection mode for detecting synchronization signals emitted by a satellite positioning system.

23. A system as claimed in claim 17, wherein the the seismic device comprises a detection module for detecting synchronization signals emitted by a radio transmitter.

24. A system as claimed in claim 18, wherein the seismic device comprises a detection module for detecting synchronization signals emitted by a radio transmitter.

25. A system as claimed in claim 18, wherein the terminal station is a local station comprising a generator for generating a signal synchronous with the time break of the seismic data stored in the seismic signal to acquisition units.

26. A system as claimed in claim 18, wherein the terminal station is a local unit.

27. A system as claimed in claim 20, wherein the terminal station is a local unit.

28. A system as claimed in claim 20, wherein the seismic device comprises a detection module for detecting synchronization signals emitted by a satellite positioning system.

29. A system as claimed in claim 21, wherein the seismic device comprises a detection module for detecting synchronization signals emitted by a satellite positioning system.

30. A system as claimed in claim 20, wherein the seismic device comprises a detection module for detecting synchronization signals emitted by a radio transmitter.

31. A system as claimed in claim 21, wherein the seismic device comprises a detection module for detecting synchronization signals emitted by a radio transmitter.

32. A system as claimed in claim 22, wherein the seismic device comprises a detection module for detecting synchronization signals emitted by a radio transmitter.

33. A system as claimed in claim 25, wherein the terminal station is a local unit.

34. A system as claimed in claim 25, wherein the seismic device comprises a detection module for detecting synchronization signals emitted by a satellite positioning system.

35. A system as claimed in claim 26, wherein the seismic device comprises a detection module for detecting synchronization signals emitted by a satellite positioning system.

36. A system as claimed in claim 27, wherein the seismic device comprises a detection module for detecting synchronization signals emitted by a satellite positioning system.

37. A system as claimed in claim 26, wherein the seismic device comprises a detection module for detecting synchronization signals emitted by a radio transmitter.

38. A system as claimed in claim 27, wherein the seismic device comprises a detection module for detecting synchronization signals emitted by a radio transmitter.

39. A system as claimed in claim 33, wherein the seismic device comprises a detection module for detecting synchronization signals emitted by a satellite positioning system.

40. A system as claimed in claim 25, wherein the seismic device comprises a detection module for detecting synchronization signals emitted by a radio transmitter.

41. A system as claimed in claim 33, wherein the seismic device comprises a detection module for detecting synchronization signals emitted by a radio transmitter.

* * * * *